C. N. SONNICHSEN.
DRAFT APPLIANCE.
APPLICATION FILED JUNE 27, 1911.
1,009,350.
Patented Nov. 21, 1911.
2 SHEETS—SHEET 2.
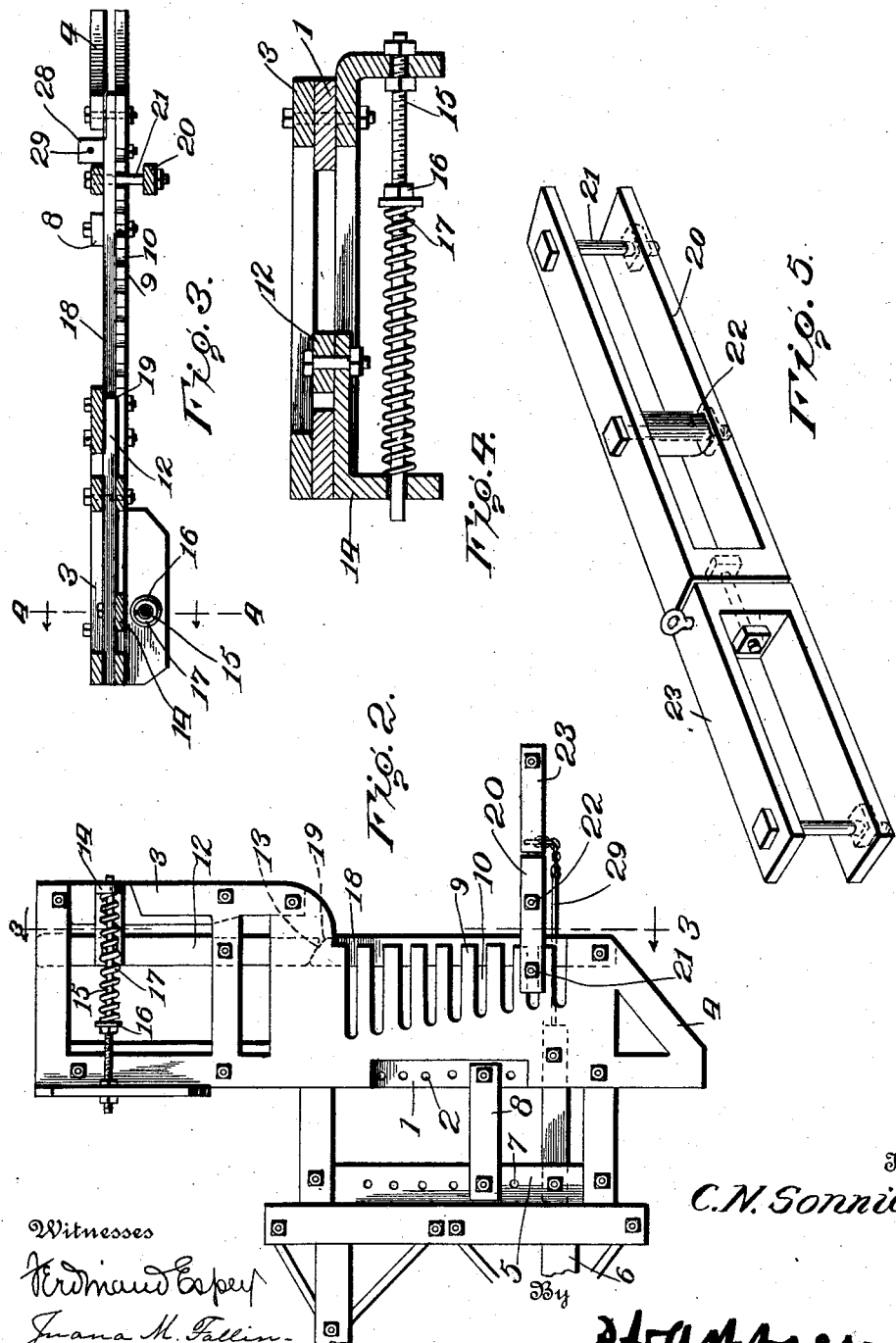
Witnesses
Ferdinand Esper
Juana M. Fallin
Inventor
C. N. Sonnichsen
By
Attorneys.

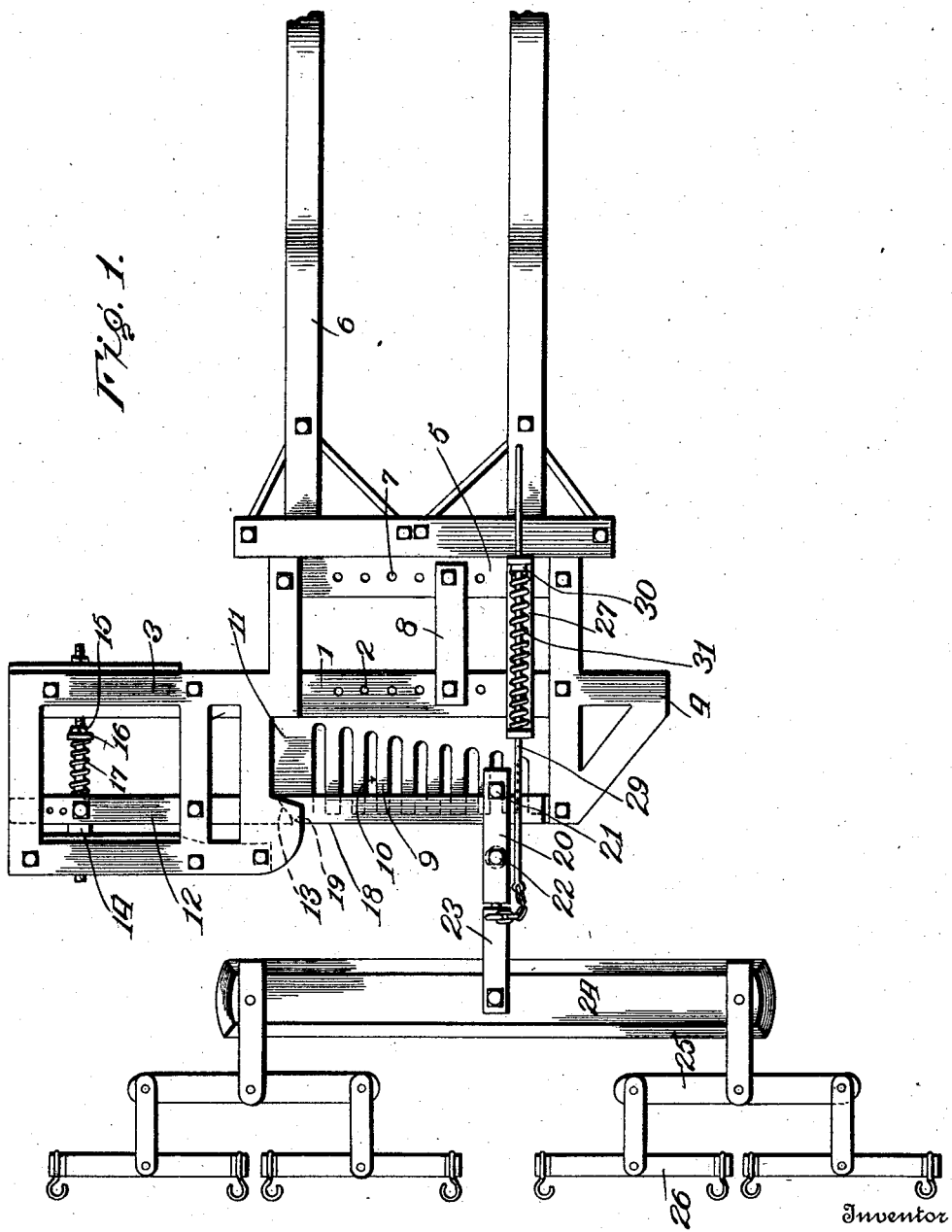

UNITED STATES PATENT OFFICE.

CHRISTIAN N. SONNICHSEN, OF BRIDGEWATER, SOUTH DAKOTA.

DRAFT APPLIANCE.

1,009,350.  Specification of Letters Patent.  Patented Nov. 21, 1911.

Application filed June 27, 1911. Serial No. 635,672.

*To all whom it may concern:*

Be it known that I, CHRISTIAN N. SONNICHSEN, citizen of the United States, residing at Bridgewater, in the county of McCook and State of South Dakota, have invented certain new and useful Improvements in Draft Appliances, of which the following is a specification.

This invention relates to draft appliances especially adapted to be applied to the beams of breaking gang plows, and has for its object to provide simple and effective means for disconnecting the draft animals from the plow should the plow encounter a large root, stone or other obstruction. By having the parts so arranged the shoulders of the draft animals are protected from injury and the harness and parts of the plow are not subjected to excessive strain by reason of the character of the impact mentioned.

A further object of the invention is to provide means for holding the swingle and double trees in elevated positions after they have been detached from the draft appliance so that they may not fall against the heels of the draft animals.

In the accompanying drawings:—Figure 1 is a top plan view of the draft appliance; Fig. 2 is an under plan view of the same; Fig. 3 is a longitudinal sectional view of the same cut on the line 3—3 of Fig. 2; Fig. 4 is a transverse sectional view of the same cut on the line 4—4 of Fig. 3; Fig. 5 is a perspective view of a yoke and clevis forming part of the appliance.

Corresponding and like parts are referred to in the following description and indicated in all the views of the accompanying drawings by the same reference characters.

The draft appliance includes a frame consisting of a transversely disposed bar 1 having at its intermediate portion a series of perforations 2. The frame also includes end frame pieces 3 and 4 which are provided at their inner sides with rearwardly projecting portions adapted to be secured to a cross bar 5 mounted upon the forward ends of the plow beams 6. The cross bar 5 is provided with a series of perforations 7, whereby the end pieces 3 and 4 may be adjustably connected with the said bar. Links 8 connect the intermediate portion of the bar 1 with the bar 5 and serve to brace the intermediate portion of the bar 1 with relation to the said bar 5. The links 8 may be adjusted in their positions upon the said bars.

A plate 9 is carried by the frame of which the parts 1, 3 and 4 are component members and the said plate is provided at its forward edge with parallel slots 10 which extend parallel with the plow beams 6. These slots gradually increase in depth from that end of the frame at which the parts 4 are located toward that end of the frame at which the parts 3 are located. The upper member of the end frame pieces 3 is provided at its inner side with a recess 11. A lever 12 is fulcrumed at a point intermediate its ends between the end frame pieces 3 and has an end portion which lies between the inner edge portions of the said frame pieces 3 in the vicinity of the forward end of the recess 11. The inner edge portion of the lever 12 at the inner end thereof is chamfered as at 13. An arm 14 is pivotally and adjustably mounted at the outer end portion of the lever 12 and is provided with a downturned extremity which slidably receives the end portion of a rod 15, fixed to the outer rear portions of the frame members 3. An abutment 16 is fixed to the rod 15 and a coil spring 17 is interposed between the said abutment and the downturned extremity of the arm 14 and is under tension with a tendency to hold the arm 14 toward the forward edge portions of the frame members 3.

A bar 18 is pivotally connected at its outer end between the forward portions of the frame end pieces 4, the pivotal connection between the said bar and the frame being sufficiently loose to permit the said bar to swing at a horizontal plane at its free end portion when the free end thereof is not confined between the inner edge portions of the frame pieces 3. The said bar 18 normally lies over the forward edge portion of the plate 9 and across the outer ends of the slots 10 therein, closing the said slots and serving as means for retaining double and swingle trees as will be hereinafter explained. The forward edge of the free end portion of the bar 18 is chamfered as at 19 and normally bears against the chamfered end 13 of the lever 12.

A yoke 20 is adapted to straddle the bar 18 and is provided with a cross bolt 21 which may be passed through any one of the slots 10, whereby the said yoke may be pivotally and adjustably mounted at any desired point along the length of the bar 18. A roller 22 is journaled between the intermediate portions of the sides of the yoke 20 and at times is adapted to engage the forward edge of the bar 18, whereby the rearward movement of the said yoke with relation to the said bar is limited. The roller is freely journaled and consequently as the yoke swings with relation to the bar 18 the said roller may turn and reduce friction at the point of contact between the yoke and the bar. A clevis 23 is pivoted at the forward end of the yoke 20 and is free to turn in either direction at a right angle to the long dimension of the yoke 20. A whiffletree 24 is connected with the clevis 23 in any appropriate manner and doubletrees are mounted at the end portions of the whiffletree. Swingle-trees 26 are connected with the end portions of the double-trees and it is to the said swingle-trees that the draft animals (not shown) are hitched.

A clip 27 is fixed to the bars 1 and 5 and is provided with angularly disposed ends 28. A rod 29 is slidably received within the ends 28 of the said clip and at its forward end is pivotally connected with the clevis 23 at one side of the point of connection between the said clevis and the yoke 20. An abutment 30 is mounted upon the rod 29 at a point between the extremities 28 of the said clip and a coil spring 31 is interposed between the said abutment and the forward extremity 28 of the said clip. This spring is under tension with a tendency to hold the rod 29 in a rearward position in the clip, but when excessive strain is applied to the rod it may move in a forward direction against the tension of the said spring but at no time can the clevis 23 become completely detached from the major portion of the draft appliance.

It is apparent that by shifting the yoke 20 along the bar 18 the bolt 21 may be positioned in any one of the slots 10 and the clip 27 may be secured to the bars 1 and 5 at any desired point. Consequently the draft strain from the whiffletree may be applied to the plow beams at any desired points between their ends or at their ends. Thus side draft on the part of the plow bottoms (not shown) may be counteracted.

When the parts are applied to the forward ends of the plow beams and the draft animals are hitched to the swingle-trees and are pulling the plows in a forward direction, should any one of the bottoms encounter a large or tough root, stone or other obstruction in the soil which will check the forward movement of the beams, the strain incident to this compact will cause the rod 29 to move longitudinally, whereby the spring 31 is depressed. At the same time the bolt 21 will pull against the rear edge of the bar 18 and the said bar is swung upon its pivot so that its chamfered end 19 brushes past the chamfered end 13 of the lever 12. As the lever 12 swings, the arm 14 carried thereby will compress the spring 17 mounted upon the rod 15. Therefore the draft animals may continue to move in a forward direction but the plows will come to a state of rest. This will materially relieve the shoulders of the animals and the harness and parts of the plow. By reason of the fact that the rod 29 is pivotally connected with the clevis 23, the said clevis and its attachments cannot drop down upon the heels of the draft animals. After the yoke 20 has become disconnected from the bar 18 and the plate 9, it may be repositioned upon the appliance by swinging the free end of the bar 18 in a forward direction and passing it through the opposite sides of the said yoke 20 between the bolt 21 and roller 22. The free end portion of the bar 18 is then lifted above the plane of the upper surface of the uppermost frame piece 3 and is swung back and permitted to fall through the recess 11 in the uppermost frame piece 3, and when strain is applied to the yoke 20 the free end of the said bar 18 will be drawn in a forward direction so that its chamfered end 19 will engage the chamfered end 13 of the lever 12. Under ordinary conditions the combined tension of the springs 31 and 17 is sufficient to hold the chamfered end of the bat 18 behind the chamfered end of the lever 12 during the plowing operation, but as soon as the strain is increased by reason of the plow bottoms meeting an obstruction, these springs will give and permit the free end of the bar 18 to swing forwardly as above indicated, thereby releasing the draft animals from the draft appliance.

Having thus described the invention, what is claimed as new is:

1. A draft appliance comprising a frame, a lever fulcrumed thereon, means for resiliently holding the lever in a normal position, a bar pivoted upon the frame and having a free end portion engaging the lever, a hitching device mounted upon the bar, and means for holding the hitching device in an adjusted position upon the bar.

2. A draft appliance comprising a frame, a lever fulcrumed thereon, means for resiliently holding the lever in a normal position, a slotted plate carried by the frame, a bar pivoted upon the frame and having a free end portion which engages the lever, said bar normally extending transversely of the slots in the said plate, and a hitching device mounted upon the bar and passing through one of the slots in the plate.

3. A draft appliance comprising a frame, a lever fulcrumed thereon, means for resiliently holding the lever in a normal position, said frame including spaced end pieces one of which is provided at its inner edge with a recess, said lever having an end portion lying between the said spaced end pieces adjacent the said recess, a bar loosely pivoted upon the frame and adapted to be inserted through the said recess in contact with the lever, and a hitching device carried by the bar.

4. A draft appliance comprising a frame, a bar pivoted thereon, resilient means carried by the frame and normally holding the bar closed and against swinging movement, a hitching device mounted upon the bar, and an extensible member connected with the hitching device and frame and adapted to hold the hitching device when the bar swings to open position.

In testimony whereof, I affix my signature in presence of two witnesses.

CHRIS. N. SONNICHSEN. [L. S.]

Witnesses:
ANDREAS M. SONNICHSEN,
O. ARNOLD.

Copies of this patent may be obtained for five cents each, by addressing the "Commissioner of Patents, Washington, D. C."